(12) United States Patent
Zehavi et al.

(10) Patent No.: US 7,613,171 B2
(45) Date of Patent: Nov. 3, 2009

(54) CELLULAR NETWORK SERVICE OVER WLAN

(75) Inventors: Ephraim Zehavi, 3 Moshe Sneh Street, Haifa (IL); Doron Herzlich, Ramat Hasharon (IL)

(73) Assignee: Ephraim Zehavi, Haifa (IL)

( * ) Notice: Subject to any disclaimer, the term of this patent is extended or adjusted under 35 U.S.C. 154(b) by 1222 days.

(21) Appl. No.: 10/930,620

(22) Filed: Aug. 31, 2004

(65) Prior Publication Data

US 2006/0045069 A1    Mar. 2, 2006

(51) Int. Cl.
    *H04L 12/66* (2006.01)
(52) U.S. Cl. .............. 370/352; 370/338; 455/552.1
(58) Field of Classification Search ........... 370/311, 370/338, 352; 455/416, 452.2, 552.1
    See application file for complete search history.

(56) References Cited

U.S. PATENT DOCUMENTS

| 6,680,923 | B1 | 1/2004 | Leon |
| 6,788,656 | B1 | 9/2004 | Smolentzov et al. |
| 6,804,532 | B1 | 10/2004 | Moon et al. |
| 6,826,154 | B2 | 11/2004 | Subbiah et al. |
| 7,187,923 | B2 * | 3/2007 | Mousseau et al. ........... 455/416 |
| 7,200,417 | B2 * | 4/2007 | Belkin et al. ............. 455/552.1 |
| 7,315,521 | B2 * | 1/2008 | Gadamsetty et al. ........ 370/311 |
| 7,356,015 | B2 * | 4/2008 | Ibe et al. .................... 370/338 |
| 7,356,348 | B2 * | 4/2008 | Bifano et al. ............. 455/552.1 |
| 2006/0025148 | A1 * | 2/2006 | Karaoguz et al. ........ 455/452.2 |
| 2006/0268806 | A1 * | 11/2006 | Meier et al. ................ 370/338 |
| 2007/0206570 | A1 * | 9/2007 | Gernert et al. ............. 370/352 |
| 2008/0304460 | A1 * | 12/2008 | Thermond ................. 370/338 |

OTHER PUBLICATIONS

M. Buddhikot, et al., "Integration of 802.11 and Third-Generation Wireless Data Networks", Proceedings of IEEE Infocom 2003, San Francisco, Apr. 2003.
M. Buddhikot, et al., "Design and Implementation of a WLAN/CDMA2000 Interworking Architecture", IEEE Communication Magazine, Nov. 2003.

* cited by examiner

*Primary Examiner*—Gerald Gauthier
(74) *Attorney, Agent, or Firm*—D. Kligler I.P. Services Ltd.

(57) ABSTRACT

A method for communication includes initiating a call between a mobile station in a cellular communication network and a subscriber unit that is accessible via the cellular communication network. A first connection to serve the call is opened between a base station in the cellular communication network and the mobile station. A second connection to serve the call is opened between the mobile station and an access point in a wireless local area network (WLAN). While the first connection is open, data traffic is conveyed between the mobile station and the subscriber unit via the second connection.

80 Claims, 5 Drawing Sheets

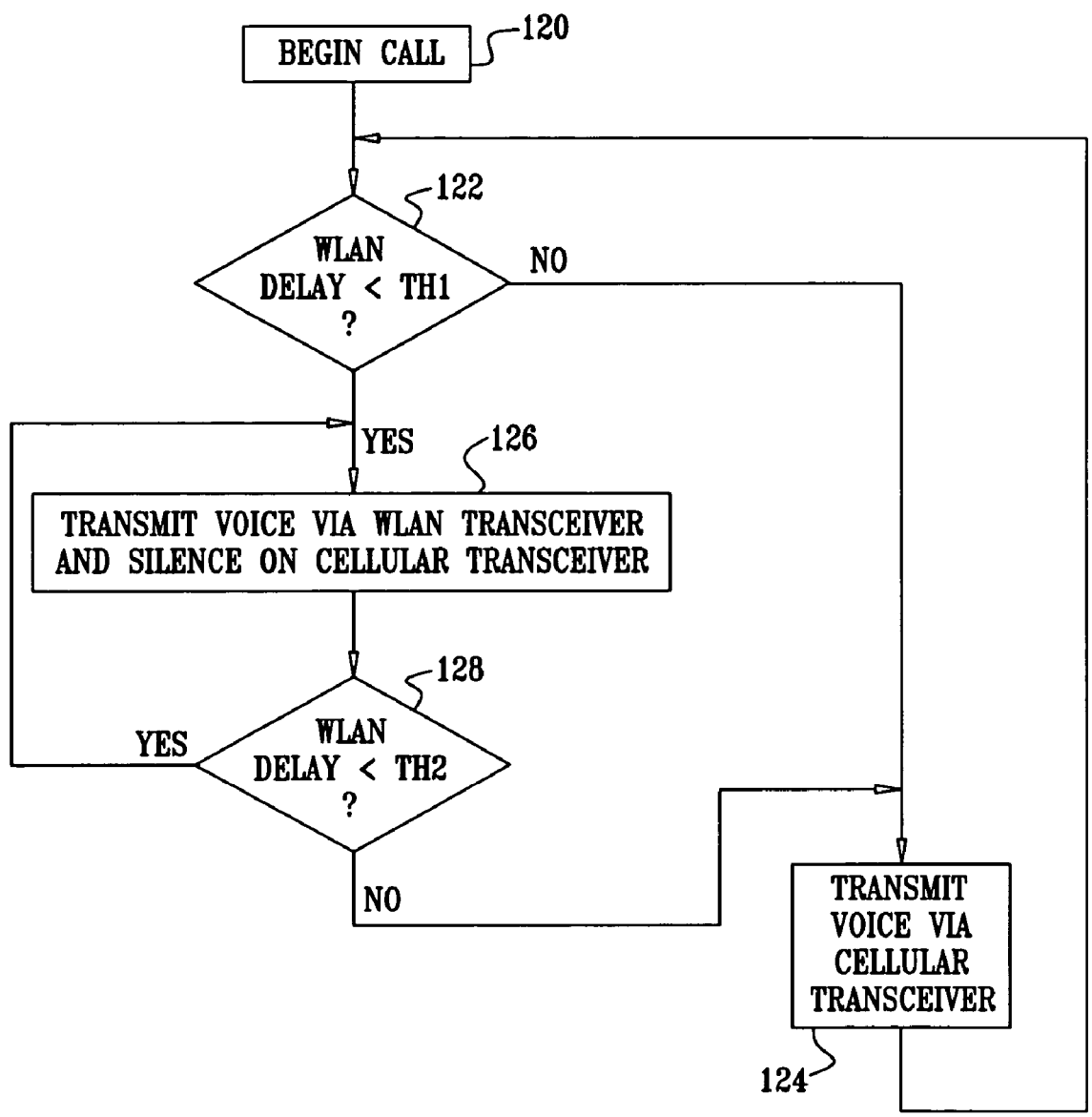

CELLULAR NETWORK SERVICE OVER WLAN

FIELD OF THE INVENTION

The present invention relates generally to wireless communications, and specifically to integration of a wireless local area network (WLAN) into a cellular telephone network.

BACKGROUND OF THE INVENTION

There has recently been growing interest in the possibility of integrating WLAN and cellular network services. Buddhikot et al. provide a useful overview of proposed approaches to WLAN/cellular integration for wireless data services in "Integration of 802.11 and Third-Generation Wireless Data Networks," *Proceedings of IEEE Infocom 2003* (San Francisco, April, 2003), which is incorporated herein by reference.

WLANs operating in accordance with the IEEE 802.11 standards operate in the unlicensed ISM bands and support data rates between 1 Mbps and 54 Mbps, at low capital cost. WLAN access points, however, are generally limited in range, covering areas no bigger than a few thousand square meters. They are most commonly deployed indoors, in business facilities, homes and at "hot spots" in public buildings.

Cellular networks, by contrast, offer ubiquitous coverage, with much lower data rates and high capital cost. Third-generation (3G) cellular standards, such as CDMA2000 and UMTS, for example, offer peak data rates that range from 64 kbps up to 2 Mbps. Integrating WLAN and cellular services would allow network operators to expand their user base, improve their return on investment, and offer users enhanced performance. Such integration requires deployment of mobile devices with dual radio interfaces (which are already becoming available on the market) and suitable interworking between equipment and protocols on the WLAN and cellular networks.

Buddhikot et al. describe two possible approaches to the design of an integrated 3G/802.11 network, which they refer to as "tightly-coupled" and "loosely-coupled" architectures. The rationale behind the tightly-coupled approach is to make the 802.11 network appear to the 3G core network as though it were another 3G cellular access network. In this approach, the 802.11 network emulates functions that are natively available in 3G radio access networks. For this purpose, a WLAN gateway hides the details of the 802.11 network from the 3G core and implements all the 3G protocols that are required in a 3G radio access network. Mobile stations in the network are required to implement the 3G protocol stack on top of their standard 802.11 network cards, and switch between their cellular and 802.11 radio interfaces as needed. The WLAN and cellular networks would share the same authentication, signaling, transport and billing infrastructures, independently of the protocols used at the physical layer on the radio interface. The authors maintain that the tightly-coupled approach is complex, costly and inflexible, and is therefore unlikely to gain wide acceptance.

The loosely-coupled approach also uses a WLAN gateway, which in this case connects to the Internet and does not have any direct link to the elements of the 3G cellular network. Users accessing services of the WLAN gateway may include users that have locally signed on, as well as mobile users visiting from other networks. In this approach, different mechanisms and protocols can be used to handle authentication, billing and mobility management in the 3G and 802.11 portions of the network. To interwork with the 3G network, the WLAN gateway must support Mobile-IP functionalities to handle mobility across networks, and must enable the 3G provider to collect the WLAN accounting records and generate a unified billing statement, as well as applying the service policies of the 3G network in the WLAN environment. Buddhikot et al. favor the flexibility offered by the loosely-coupled approach, but they are concerned essentially with data services and do not relate to the special requirements of voice calls.

U.S. Pat. No. 6,680,923, to Leon, describes a system for hybrid communication, which provides data communication either over a computerized network, such as the Internet, or over the air, via a cellular network or other wireless network. A wireless communication device, such as a cellular telephone or personal digital assistant (PDA), has an additional transceiver that communicates with a computer using Bluetooth™ or equivalent technology, and thus can access the Internet or other computer networks. The system incorporates auto-switching, so that when the additional transceiver is not successful in achieving network access, the cellular or other wireless network is used for data communication.

SUMMARY OF THE INVENTION

Embodiments of the present invention provide a novel approach to integration of an ancillary network, such as a WLAN, with cellular network communications. In these embodiments, a mobile station has dual interfaces: one for communicating with the cellular network and one for the ancillary network, both of which may be active simultaneously. The ancillary network is independent of the cellular network and may operate according to its own protocols. It is typically linked to the cellular network by a hub, which is referred to herein as an information switching controller (ISC).

When a call is placed to or from the mobile station, a connection is opened between the cellular interface of the mobile station and a base station of the cellular network. At the same time, the hub attempts to open a connection to the mobile station through the ancillary network. If this second connection is made successfully and is determined to offer adequate quality of service (QoS) for the call, the ancillary network may then be used to carry the data transmitted during the call between the mobile station and the other party to the call, thus bypassing the cellular base station. The first connection between the base station and the mobile station remains open during the call, but typically transmits null data (for example, silence in the case of a voice call). As a result, the amount of base station bandwidth that is allocated to the call is reduced to the minimum necessary for keeping the first connection "alive" in the cellular network.

It may often occur during the course of the call that the QoS provided by the ancillary network connection degrades. Assuming the ancillary network to be a WLAN, for example, such degradation may occur if the user of the mobile station moves out of the coverage area of the WLAN, or if other data traffic or interference increases abruptly. In such a case, the mobile station immediately begins to transmit and receive the call data through the first connection to the cellular base station, instead of through the ancillary network. This seamless handover is made possible by the fact that the first connection has remained open throughout the call and is available to carry the data. The user of the mobile station is typically unaware that the handover has occurred at all. Later in the course of the call, if QoS on the ancillary network improves, the traffic may be handed back to the ancillary network.

In some embodiments of the present invention, the call is a voice or video call, and the data traffic conveyed during the call thus comprises streaming media, such as voice and/or video data. In these embodiments, the seamless handover between the cellular and ancillary networks is particularly important, since it permits the user to continue transmitting and receiving the voice and/or video without interruption. By contrast, in loosely-coupled models of cellular/WLAN integration, handover from the WLAN to the cellular network is slow—typically lasting as long as ten seconds—since a new connection must be established between the mobile station and the cellular network before data communications can resume. This lengthy handover may be tolerable in non-streaming packet data applications, but for voice and video calls it is clearly unacceptable. Tightly-coupled models are capable of seamless handover, but require large investments in infrastructure and suffer from other practical problems, as noted in the Background. Embodiments of the present invention, on the other hand, may be implemented using existing networks and dual-interface mobile stations, simply by the addition of the ISC and suitable software for interfacing between the networks.

Although the embodiments described herein are directed to integration of a WLAN with a cellular network, the principles of the present invention may similarly be applied to ancillary networks of other types. For example, the ancillary network may comprise another cellular network, with a different operator and infrastructure. The ISC supports interoperability of the two networks, so that subscribers may take advantage of the facilities of both networks simultaneously. The ISC may also be used to provide connections between mobile stations and other networks (besides the cellular network), such as packet networks used to carry voice over IP (VoIP) calls.

There is therefore provided, in accordance with an embodiment of the present invention, a method for communication, including:

initiating a call between a mobile station in a cellular communication network and a subscriber unit that is accessible via the cellular communication network;

opening a first connection to serve the call between a base station in the cellular communication network and the mobile station;

opening a second connection to serve the call between the mobile station and an access point in a wireless local area network (WLAN); and while the first connection is open, conveying data traffic between the mobile station and the subscriber unit via the second connection.

In a disclosed embodiment, the call includes at least one of a voice call and a video call, and conveying the data traffic includes conveying at least one of voice data and video data. Typically, initiating the call includes receiving a request to place the call at a switch in the cellular communication network from the subscriber unit, and opening the first and second connections responsively to the request. Alternatively, initiating the call includes receiving a request to place the call at a switch in the cellular communication network from the mobile station, and opening the second connection responsively to the request.

In some embodiments, initiating the call includes notifying an information switching center (ISC), which is coupled to the cellular communication network, of a request to open the call, and opening the second connection includes opening the second connection from the access point to the ISC via a packet network. In a disclosed embodiment, opening the second connection includes configuring the second connection to provide a predetermined quality of service (QoS) in order to serve the call. Typically, configuring the second connection includes providing a tunnel through the packet network. Initiating the call may include receiving a trigger at a switch in the cellular communication network responsively to an identity of the mobile station, and notifying the ISC of the request responsively to the trigger.

In some embodiments, conveying the data traffic includes transmitting null data over the first connection. Typically, the mobile station has first and second radio interfaces for communicating via the cellular communication network and the WLAN, respectively, and transmitting the null data includes sending an instruction to the mobile station via the second radio interface to transmit the null data via the first radio interface while transmitting the data traffic via the second radio interface. Sending the instruction may include sending a sequence of messages, each message instructing the mobile station to transmit the data traffic via the second radio interface for a successive predetermined time interval. If the mobile station does not receive a further message within the predetermined time interval of a preceding message in the sequence, the data traffic subsequent to the predetermined time interval is transmitted via the first radio interface.

Typically, if the second connection is broken during the call, the method includes continuing to transmit the data traffic via the first connection.

In an aspect of the invention, conveying the data traffic includes measuring a quality of service (QoS) on the second connection, and conveying the data traffic via the second connection if the QoS exceeds a predetermined threshold, while conveying the data traffic via the first connection if the QoS on the second connection is below the predetermined threshold. In a disclosed embodiment, measuring the QoS includes measuring a packet delay in transmission over the second connection. Additionally or alternatively, measuring the QoS includes monitoring the QoS during the call, and if the QoS decreases below a predetermined level, transmitting the data traffic via the first connection rather than the second connection.

The method may include receiving, during the call, a request to transfer the call from the mobile station to a land line, and transferring the call to the land line, responsively to the request, while keeping the first connection open.

There is also provided, in accordance with an embodiment of the present invention, a method for communication, including:

opening a connection, via a base station in a cellular communication network, between a mobile station and a switch in the cellular communication network; and while the connection is open, conveying data traffic between the mobile station and the switch via an access point in a wireless local area network (WLAN).

In some embodiments, opening the connection includes linking the base station to an information switching center (ISC), and conveying the data traffic includes transmitting the data traffic between the access point and the ISC via a packet network. In one embodiment, the ISC is connected to a further communication network, separate from the cellular communication network, and conveying the data traffic includes passing the data traffic via the ISC between the mobile station and a second party on the further communication network. Typically, the further communication network includes a packet network, and passing the data traffic includes placing a Voice over Internet Protocol (VoIP) call between the mobile station and the second party.

In another embodiment, the mobile station is coupled to communicate via multiple access points in one or more WLANs, and conveying the data traffic includes selecting one of the access points to communicate with the mobile station using the ISC. Typically, selecting the one of the access points includes measuring a quality of service (QoS) of transmission of data packets via each of the access points, and selecting the one of the access points responsively to the QoS. Additionally or alternatively, when the mobile station is one of a plurality of mobile stations that are coupled to the one or more WLANs, selecting the one of the access points includes assigning a respective one of the access points to serve each of the mobile stations so as to provide a common bandwidth to all of the mobile stations.

In one embodiment, conveying the data traffic includes conveying a first portion of the data traffic via the access point while simultaneously conveying a second portion of the data traffic via the connection.

In another embodiment, conveying the data traffic includes selectively conveying a portion of the data traffic via the access point so as to minimize a volume of the data traffic that is conveyed through the cellular communication network. Additionally or alternatively, conveying the data traffic includes selectively conveying a portion of the data traffic via the access point so as to maximize a number of calls carried by the cellular communication network. Further additionally or alternatively, conveying the data traffic includes conveying a first portion of the data traffic via the access point and conveying a second portion of the data traffic via the connection, while allocating the data traffic between the first and second portions so as to maintain a constant bandwidth for transmission of the data traffic to the mobile station.

In a disclosed embodiment, conveying the data traffic includes controlling conveyance of the data traffic via the access point and the connection using an application-level program running on the mobile station.

There is additionally provided, in accordance with an embodiment of the present invention, a method for communication, including:

opening a connection, via a base station in a cellular communication network, between a mobile station and a switch in the cellular communication network; and while the connection is open, conveying data traffic between the mobile station and the switch via an ancillary communication network, without conveying the data traffic through the base station.

In a disclosed embodiment, the ancillary communication network includes a packet data network, such as a wireless local area network (WLAN).

In another embodiment, opening the connection includes opening a first connection via a first cellular communication network, and the ancillary communication network includes a second cellular communication network. Conveying the data traffic may include assessing respective costs of conveying the data traffic via the cellular communication network and the ancillary communication network, and deciding whether to convey the data traffic via the cellular communication network or the ancillary communication network responsively to the respective costs.

There is further provided, in accordance with an embodiment of the present invention, apparatus for communication, including:

a mobile station, having a first radio interface for communicating with a cellular communication network, and a second radio interface for communicating with a wireless local area network (WLAN); and an information switching controller (ISC), which is adapted to receive a message indicative of initiation of a call between the mobile station and a subscriber unit that is accessible via the cellular communication network, and is further adapted, responsively to the message, to open a first connection to serve the call between a base station in the cellular communication network and the mobile station, and to open a second connection to serve the call between the mobile station and an access point in the WLAN, and to cause data traffic to be conveyed between the mobile station and the subscriber unit via the second connection while the first connection is open.

There is moreover provided, in accordance with an embodiment of the present invention, apparatus for communication, including:

a mobile station, having a first radio interface for communicating with a cellular communication network, and a second radio interface for communicating with a wireless local area network (WLAN); and an information switching controller (ISC), which is adapted to open a connection, via a base station in the cellular communication network, between the mobile station and a switch in the cellular communication network, and to cause data traffic to be conveyed between the mobile station and the switch via an access point in a wireless local area network (WLAN) while the connection is open.

There is furthermore provided, in accordance with an embodiment of the present invention, apparatus for communication, including:

a mobile station, having a first interface for communicating with a cellular communication network, and a second interface for communicating with an ancillary communication network, which is separate from the cellular communication network; and an information switching controller (ISC), which is adapted to open a connection, via a base station in the cellular communication network, between the mobile station and a switch in the cellular communication network, and to cause data traffic to be conveyed between the mobile station and the switch via the ancillary communication network while the connection is open, without conveying the data traffic through the base station.

The present invention will be more fully understood from the following detailed description of the embodiments thereof, taken together with the drawings in which:

BRIEF DESCRIPTION OF THE DRAWINGS

FIG. 5 is a flow chart that schematically illustrates a method for transmitting data over two networks during a voice call, in accordance with an embodiment of the present invention.

DETAILED DESCRIPTION OF EMBODIMENTS

Figure 1:
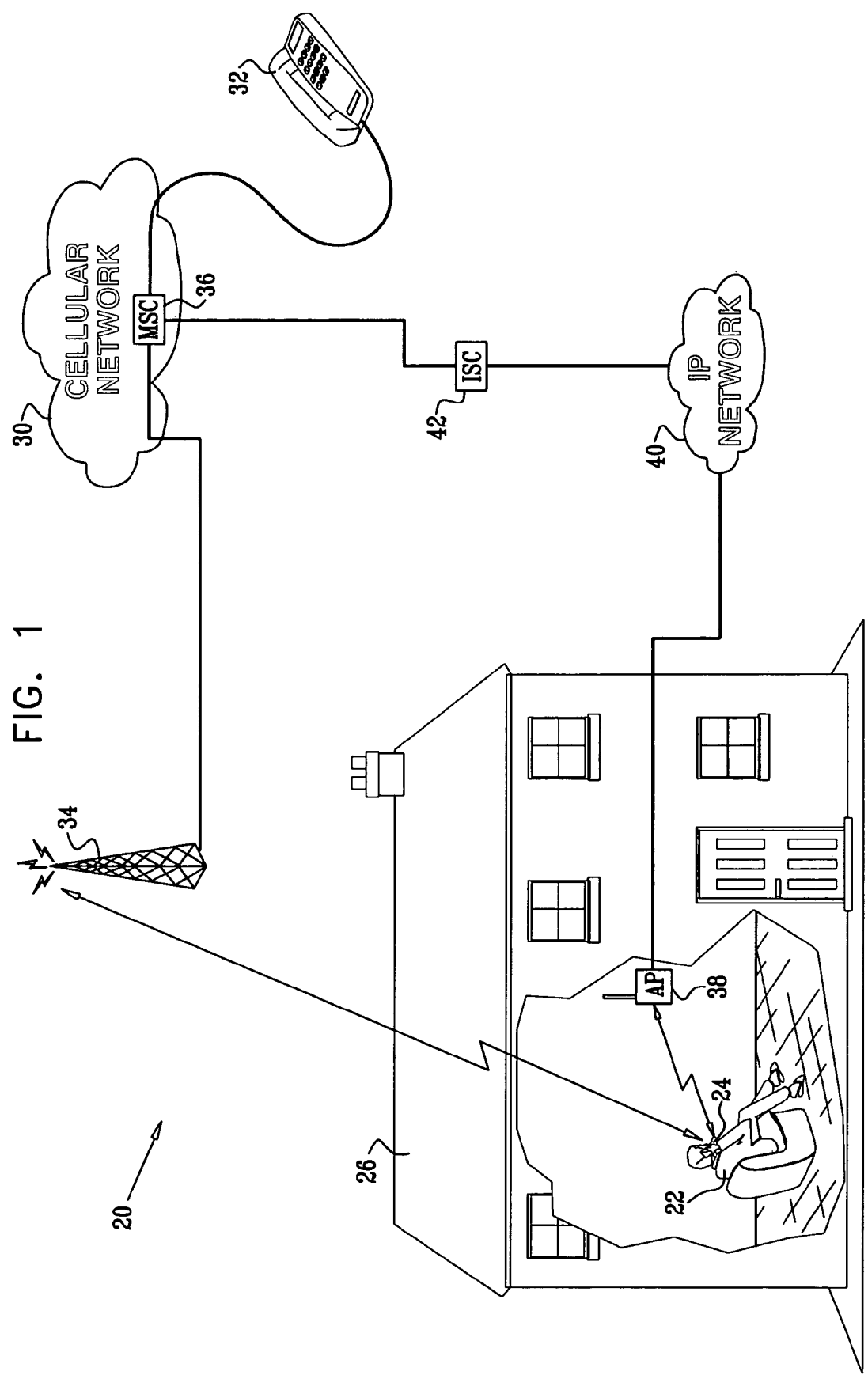
FIG. 1 is a schematic, pictorial illustration of a hybrid communication system, in accordance with an embodiment of the present invention.

FIG. 1 is a schematic, pictorial illustration of a hybrid communication system 20, in accordance with an embodiment of the present invention. In the scenario shown in FIG.

1, a telephone user 22 in a building 26 places (or receives) a call on a mobile station 24 via a cellular telephone network 30 to (or from) another subscriber telephone 32. The call is established via a radio connection between telephone 24 and a cellular base station 34. Signals are transmitted between the base station and a switch 36 in network 30, and from the switch to telephone 32.

In this embodiment, network 30 is assumed to be a second-generation cellular voice network, such as a GSM or CDMA network, and switch 36 is identified for convenience as a mobile switching center (MSC). Alternatively, network 30 may comprise a 3G or other cellular packet network, such as a CDMA2000 or UMTS network, in which case base station 34 could comprise a radio network controller (RNC), while switch 36 comprises a packet control function (PCF) or General Packet Radio Service (GPRS) node. Further alternatively, network 30 may comprise a mix of 2G and 3G elements. In this case, base station 34 might comprise a RNC or BSC, while switch 36 could comprise any of a PCF, GPRS node or MSC. Although embodiments of the present invention are described hereinbelow, for the sake of simplicity, with reference to elements of GSM and UMTS networks, the principles of these embodiments may be implemented in a straightforward manner in other types of second- and third-generation cellular networks.

Figure 3:
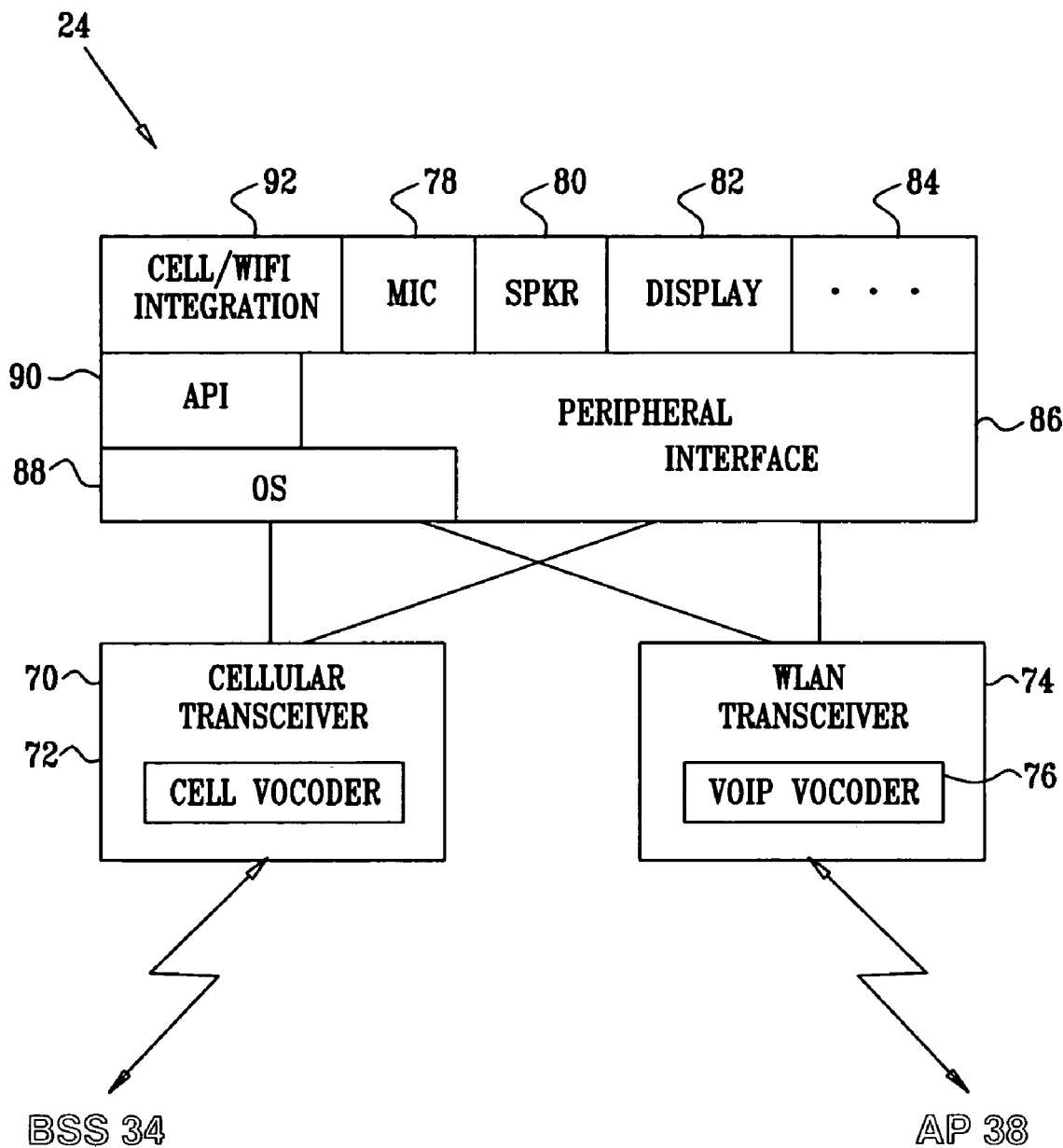
FIG. 3 is a block diagram that schematically illustrates functional components of a dual-interface mobile station, in accordance with an embodiment of the present invention.

Mobile station 24 has dual radio interfaces: one for communicating with base station 34 in a cellular band, typically in the range of 900 MHz or 1800-2100 MHz (PCS) or both, and another for communicating with a WLAN access point 38. Typically, the WLAN interface and access point 38 operate in the 2.4 GHz or 5 GHz ISM band, in accordance with the IEEE 802.11 family of standards. Alternatively, the principles of the present invention may likewise be applied to other types of WLANs, such as HiperLAN, Bluetooth, HiSWAN or WiMAX-based systems. Dual-interface mobile stations that may be used in embodiments of the present invention are starting to become commercially available; for example, Texas Instruments, Nokia and Qualcomm have announced that they are planning to introduce products of this sort. Functional details of an exemplary mobile station are shown in FIG. 3 and are described hereinbelow with reference to this figure. The term "mobile station" is used in the present patent application and in the claims to denote a client device in the cellular network. Typically, such mobile stations are configured as cellular telephones, but they may alternatively comprise computing devices with communication interfaces, such as a suitable PDA, portable computer or even a desktop computer or other appliance. In other words, the term "mobile" does not necessarily mean that mobile station 24 is portable, but only that it is configured as a client in a mobile communication network.

Access point 38 is connected through a suitable router and modem (not shown) to a packet data network 40, which typically operates in accordance with the Internet Protocol (IP). In dual-interface mobile stations known in the art, the connection to packet network 40 is used by subscriber 22 for data-related functions, such as Internet browsing or sending and receiving electronic mail, separate and apart from the voice calls that are carried through cellular network 30. In embodiments of the present invention, however, packet network 40 is connected to cellular network 30 through an information switching controller (ISC) 42. The function of ICS 42, which is described in detail hereinbelow, is to handle calls placed through cellular network 30 so that some or all of the data traffic carried by such calls passes through packet network 40, rather than through base station 34. Typically, this data traffic comprises streaming digital media, such as voice or video data.

In a typical call scenario, a call is placed from telephone 32 to mobile station 24. MSC 36 signals ISC 42 that the call has been initiated. In response, the ISC instructs the MSC to open a connection through base station 34 to mobile station 24. At the same time, the ISC checks for the existence of a second connection through access point 38 to mobile station 24. The first connection, through base station 34, remains open throughout the call. The second connection may be broken if, for example, user 22 moves out of the coverage area of access point 38 (such as if he goes outside structure 26). Dual connections are similarly established for outgoing calls originating from mobile station 24.

During the call, ISC 42 intermittently checks the quality of the packet connection through network 40 to ascertain that it is capable of carrying streaming voice data (or other media) with acceptable quality. For example, other users in structure 26 who share access point 38 may load the capacity of the access point, and thus reduce the data rate available to mobile station 24. As another example, interference in the vicinity of the access point may intermittently reduce the data rate. Furthermore, if user 22 moves away from the access point (or leaves the structure), the data rate of the WLAN connection will be reduced until the connection is finally broken. Under any of these conditions, the packet delay will increase, and the QoS on the packet connection will degrade to the point that ISC 42 may determine that the packet connection cannot adequately serve the call between mobile station 24 and telephone 32. In this case, the ISC will convey the data traffic on the call through base station 34.

At most times, however, when user 22 is inside structure 26 (or in the service area of another suitable WLAN), ISC 42 is likely to discover that the quality of the connection to mobile station 24 through access point 38 is adequate for streaming of the call data traffic. At such times, the ISC diverts all downstream call data from telephone 32 to mobile station 24 through packet network 40, and instructs mobile station 24 to transmit all upstream call data through access point 38. Meanwhile, to keep the connection through base station 34 open, the ISC transmits null data (silence, in the case of voice data) through base station 34, and instructs mobile station 24 similarly to transmit null data through its cellular interface. The cellular transceivers in base station 34 and mobile station 24 are already designed, under these conditions, to cut back the transmission power and data rate used on the connection between the base station and mobile station to the minimum necessary for keeping the connection alive. As a result, base station 34 has more bandwidth available for serving connections to other users.

ISC 42 continues to route the call data traffic through packet network 40 only as long as the QoS of the connection through the packet network is sufficiently high. If the ISC detects a degradation in the QoS or a break in the WLAN connection, it immediately transfers the data traffic back through base station 34. Because the connection through the cellular network has remained open throughout the call, the "handover" of the call from the packet network connection to the cellular network connection is instantaneous—the cellular transceivers of base station 34 and mobile station 24 simply resume transmission of actual data in place of null data. If the packet connection is subsequently restored to adequate QoS, ISC 42 may hand the call back to access point 38.

The use of ISC 42 in system 20 can increase very substantially the number of telephone calls that can be handled by cellular network 30. Although 3G cellular networks will be used increasingly for non-streaming data applications, voice calls (and possibly video calls in the future) will continue to occupy the vast majority of the available network resources. It is estimated that as many as 80% of cellular calls are conducted indoors. Indoor calls require the base station and mobile station to transmit at high power in order to pass through walls in the signal path, and thus consume an even greater proportion of the available base station resources. On the other hand, indoor locations, in homes, offices and public buildings, are increasingly served by WLAN access points. By diverting the call data traffic through available WLAN connections, ISC 42 does not eliminate the use of cellular bandwidth for these indoor calls (since a silent connection is still maintained on the cellular network), but it reduces the bandwidth consumed substantially: typically by up to 75% per call in GSM networks, and up to 87.2% per call in CDMA networks.

Figure 2:
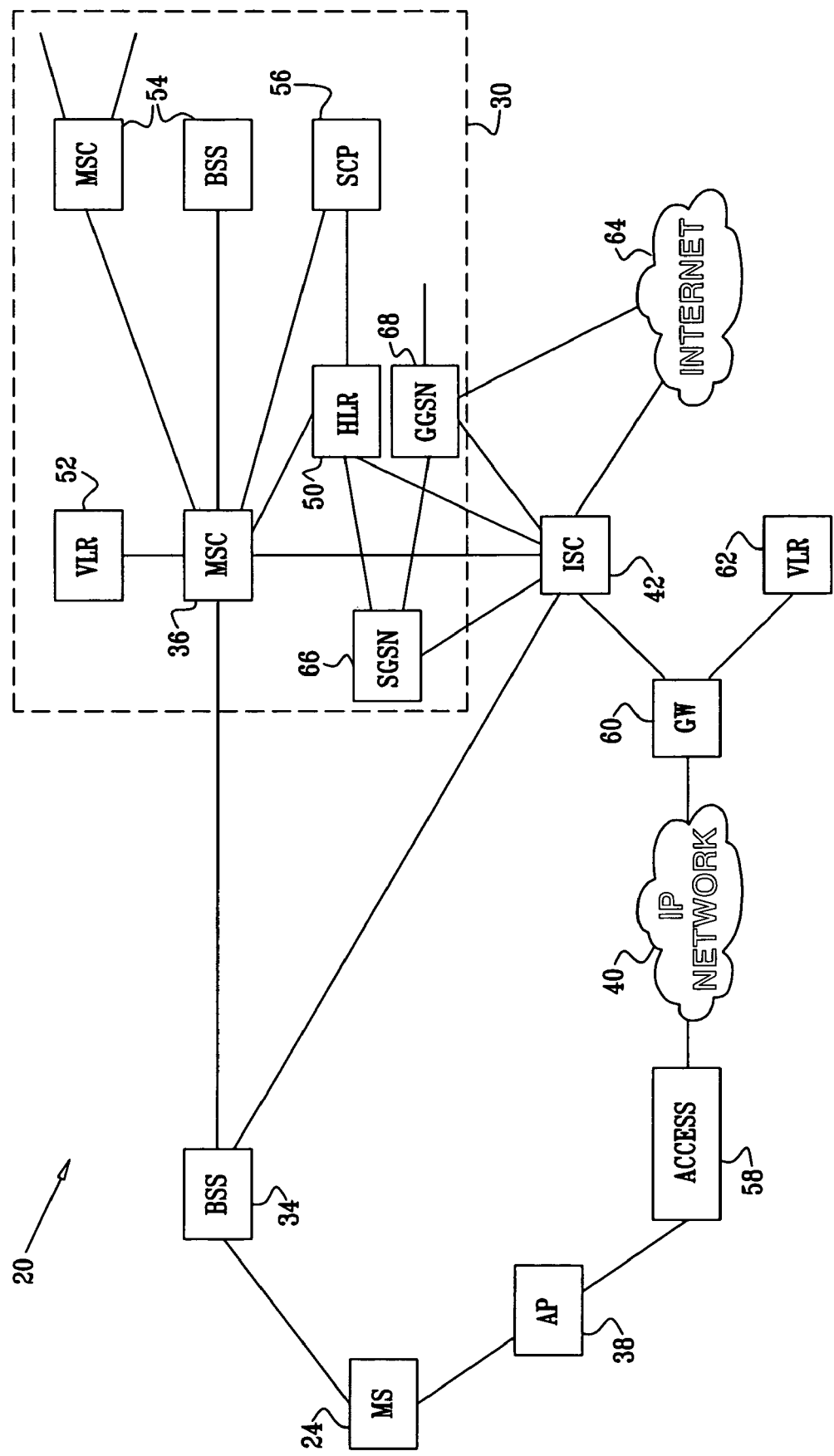
FIG. 2 is a block diagram that schematically illustrates functional components of a hybrid communication system, in accordance with an embodiment of the present invention.

FIG. 2 is a block diagram that schematically shows functional details of system 20, in accordance with an embodiment of the present invention. The system elements shown in FIG. 2 are used in implementing various aspects of the present invention, as described hereinbelow. For the purposes of this embodiment, it is assumed that the elements of cellular network 30 communicate with one another and with ISC 42 using standard Signaling System 7 (SS7) interfaces and messaging conventions.

Cellular network 30 comprises a home location register (HLR) 50 and a visitor location register (VLR) 52. The HLR holds subscriber identity information that is used for record and billing purposes, as well as for intelligent network (IN) services and features assigned to subscribers. In the case of mobile station 24, HLR 50 contains IN triggers indicating that calls to and from this mobile station are to be handled by ISC 42. VLR 52 identifies the current location of roaming subscribers. Although in the example shown in FIG. 2, HLR 50 and VLR 52 are both attached to the same MSC, when user 22 moves through other parts of the service region of cellular network 30, he may be served by another MSC 54, with its own VLR.

When a call is placed to or from mobile station 24, MSC 36 looks up the identity of the mobile station in HLR 50, and receives the appropriate IN trigger. Upon receiving this trigger, the MSC passes control of the call to a service control point (SCP) 56. The MSC may communicate with the SCP using any suitable protocol known in the art, such as INAP (IN Application Protocol) or CAMEL (customized applications for mobile network enhanced logic). The SCP queries HLR 50 and VLR 52 (via the HLR) in order to ascertain that the call is to be handled by ISC 42 and to determine the location of mobile station 24 at which the call is to take place. It then instructs the MSC to pass control of the call to ISC 42. The ISC then instructs the MSC to establish the cellular network connection for the call through base station 34, and sets up the required packet network connection through network 40. Details of the messages used in this process are shown in the Appendix below.

On the packet network side, access point 38 is typically connected through an access network 58 to packet network 40. For example, in a home or small business premises, the access point may be connected through a router to a high-speed modem, such as a digital subscriber line (DSL) or cable modem. The modem links the customer premises via the telephone or cable network to the central office of the network access provider. Typically, voice and other streaming data are carried between mobile station 24 and network 40 in the form of VoIP packets. These packets terminate at a VoIP gateway 60, which converts the packets to voice data for transmission on cellular network 30, and which similarly converts the voice data on the cellular network to VoIP packets for transmission over network 40. VoIP gateway 60 may be an off-shelf component, with its own VLR 62. The VoIP gateway interfaces with ISC 42 using standard Session Initiation Protocol (SIP) signaling. Alternatively, the VoIP gateway may be integrated with ISC 42.

In order to maximize the portion of the data traffic in telephone calls to and from mobile station 24 that is transmitted through packet network 40, it is important to ensure that VoIP packets are carried over the connection between the mobile station and ISC 42 with consistently high QoS. Various means may be employed for this purpose, at each stage of the link:

Access point 38 and mobile station 24 may implement the IEEE 802.11e standard, which provides QoS features on 802.11 WLANs. In accordance with this standard, VoIP packets (and packets carrying other streaming media) may be assigned a higher priority for transport over the WLAN than other data packets that are not delay-sensitive.

In access network 58, the network access provider may similarly prioritize streaming traffic, using protocols such as the Point-to-Point Protocol over Ethernet (PPPoE) and other tools.

VoIP packets may be transported from access network 58 to gateway 60 using a dedicated packet trunk or over a traffic-engineered path through network 40, such as a tunnel based on Multiprotocol Label Switching (MPLS).

In effect, ISC 42 attempts to set up a "conference call" for every call that is initiated or received by mobile station 24. A first leg of the conference runs from ISC 42 to mobile station 24 through cellular base station 34, while a second leg runs from ISC 42 to mobile station 24 through access point 38. (The third leg of the conference, of course, passes through cellular network 30 to telephone 32.) The ISC favors the second leg when possible, as noted above, so that the first leg is mostly silent as long as the QoS on the second leg is adequate.

ISC 42 may also use this model to serve mobile station 24 at locations outside structure 26 (and thus outside the range of access point 38), as long as the mobile station is connected to another WLAN in another facility or hot spot. In this case, VoIP packets transmitted from and to the mobile station may simply be routed through an IP wide area network (WAN), such as the Internet, without the QoS guarantees described above. Therefore, there is a greater probability that the ISC will have to route data traffic over the "first leg" of the conference call, through the cellular network.

Additionally or alternatively, ISC 42 may serve as a gateway to another network 64, such as the public Internet. In this paradigm, the ISC handles calls not only between mobile station 24 and other telephones on cellular network 30, such as telephone 32, but also between mobile station 24 and computers on network 64. Thus, for example, when a VoIP telephone user places a call through network 64 to mobile station 24, ISC 42 may open two connections to convey the call data to mobile station 24, one through base station 34 and another through access point 38.

Although the description of the functions of ISC 42 given above related mainly to voice calls, the ISC may similarly be integrated with packet radio network services, such as the services provided by a GPRS network. This aspect of the operation of ISC 42 is exemplified by connections with a serving GPRS support node (SGSN) 66 and a gateway GPRS support node (GGSN) 68, shown in FIG. 2. In communicating with the SGSN, ISC 42 emulates the behavior of a GGSN, while in communicating with the GGSN, the ISC emulates a SGSN. As a result, no changes are required in the GPRS network elements in order to accommodate the ISC. When mobile station 24 initiates or receives a data call, HLR 50 informs SGSN 66 that the GGSN that is to serve the mobile station is ISC 42, and similarly informs GGSN 68 that the SGSN that is to serve the mobile station is ISC 42. Thus, the call data traffic and signaling pass through ISC 42, as in the case of the voice call described above, and the ISC determines whether the data traffic should be conveyed via base station 34 or access point 38.

Optionally, for data applications, ISC 42 may use both legs of the call—through BSS 34 and through access point 38—to transmit data packets simultaneously. In an exemplary embodiment, mobile station 24 opens a buffer to receive data packets during a data call. ISC 42 transmits current data, at a relatively low data rate, to mobile station 24 via base station 34, and future data at a higher rate via access point 38. Buffer management software on the mobile station places the data packets from the two legs of the call in the buffer in the proper order and reads the data out of the buffer at the appropriate time.

The integration of ISC 42 with cellular network 30 permits the cellular network operator to develop new models and plans for customer billing. For example, the network operator may offer reduced billing rates to customers, such as user 22, who have dual-interface mobile stations and allow their WLANs to be used for offloading of telephone call traffic. The reduction in the billing may be proportional to the amount of data traffic that is offloaded to the WLAN. Additionally or alternatively, the network access provider, such as the telephone or cable company, may charge increased rates for guaranteeing high QoS on the packet connection between access point 38 and ISC 42. These various business models typically require not only that the ISC be capable of call signaling and switching, as described above, but also provide authentication, authorization and accounting (AAA) services, in conjunction with the concomitant services in cellular network 30. This aspect of ISC operation, however, is beyond the scope of the present patent application.

FIG. 3 is a block diagram that schematically shows details of mobile station 24, in accordance with an embodiment of the present invention. The mobile station comprises two transceivers (also referred to as radio interfaces): a cellular transceiver 70 and a WLAN transceiver 74. Each transceiver performs various modem functions required by the network with which it is to communicate, such as physical layer (PHY) modulation and demodulation, media access control (MAC) functions, security functions, and voice encoding/decoding. The latter voice-related functions are performed by a cellular vocoder 72 in transceiver 70 and a VoIP vocoder 76 in transceiver 74.

Mobile station 24 has various peripheral components, such as a microphone 78, audio speaker 80, display 82 and other components 84, as are known in the art. For low-level functions, these peripheral components are linked to transceivers 70 and 74 by a peripheral interface 86. For example, the peripheral interface transfers digital audio data from microphone 78 to vocoders 72 and 76.

Higher-level functions of mobile station 24 are controlled by an operating system 88, whose functions are accessible to application software via an application program interface (API) 90, as is known in the art. The novel functions of mobile station 24 in the present embodiment are invoked, via API 90, by an application-level cellular/WLAN integration program 92. Alternatively, program 92 may be written as a function of operating system 88.

In either case, program 92 receives messages sent by ISC 42 via WLAN transceiver 74 during telephone calls conducted using mobile station 24. Each message instructs the mobile station to transmit voice data via the WLAN transceiver, while transmitting silence via cellular transceiver 70. Upon receiving the message, program 92 directs peripheral interface 86 to couple the output of microphone 78 to VoIP vocoder 76, and to pass null data (zero) to cellular vocoder 72. Similarly, the incoming voice data from the VoIP vocoder is forwarded by the peripheral interface to speaker 80. Thus, the voice data traffic generated by user 22 is transmitted through WLAN transceiver 74. The null data input to vocoder 72 causes cellular transceiver 70 to reduce its output power and data rate to the minimal possible levels. This sort of voice-activated vocoding is a built-in function of the voice activation detector that is used in modern cellular telephones, and requires no modification in order to implement this feature of the present invention. While microphone 78 is coupled to VoIP vocoder for transmission of uplink voice traffic, the VoIP vocoder is similarly coupled to speaker 80 for playing the downstream voice traffic.

Typically, each message sent by ISC 42 to WLAN transceiver 74 instructs the mobile station to use the WLAN transceiver for voice communication for only a short period, possibly less than one second. At the end of the period, program 92 defaults back to transmitting the voice data via cellular transceiver 70 unless another message has been received from the ISC in the interim. Therefore, should the connection of mobile station 24 to ISC 42 via access point 38 suddenly degrade or be lost altogether, the mobile station will switch immediately and automatically to transmission via cellular base station 34, without waiting to receive another message from the ISC. Alternatively or additionally, if the ISC detects a degradation in QoS on the connection to access point 38, it may send a message to the mobile station instructing it to switch over to the cellular network connection for voice transmission.

Although the embodiment described above uses QoS as the basis for determining when to switch between the cellular and WLAN legs of the call, in other embodiments, alternative criteria may be used instead of or in addition to QoS. For example, ISC 42 may be programmed to preferentially route voice traffic via access point 38 so as to minimize the volume of data traffic (such as voice or video data) carried by the cellular network and/or to maximizing the total capacity of the cellular network (i.e., maximizing the number of calls that are active simultaneously in the network). These criteria enable the cellular operator to increase total traffic, though possibly at the expense of QoS. As another alternative, ISC 42 may determine when to transfer the data traffic via each of the cellular and WLAN legs so as to maintain a constant bandwidth between mobile station 24 and the ISC. Constant bandwidth ensures consistent quality in streaming applications, such as video conferencing, notwithstanding quality variations on the individual links.

When mobile station 24 is within range of more than one access point, ISC 42 may also be used to select the access point with which the mobile station is to communicate. For example, the ISC may assess the QoS of the respective links via the different access points, and may then choose the access point giving the best QoS for each call. Alternatively or additionally, the ISC may choose the access point to serve each mobile station so that all mobile stations receive the same bandwidth. This feature is important in broadcasting data over the WLAN.

Although FIG. 3 shows a certain, specific functional structure of mobile station 24 for aid in understanding the operation of this embodiment, other sorts of dual-interface mobile stations may also be used in the context of the present invention. For example, the mobile station may be configured to communicate with two different cellular networks. This sort of configuration is useful, inter alia, in areas in which neither of the cellular networks gives complete coverage in a certain service region, and the user would like the mobile station to automatically select the network that gives optimal coverage at its current location. In this case, for each call to or from the mobile station, ISC 42 attempts to open one connection between the mobile station and a base station of one cellular network, and a second connection between the mobile station and a base station of the other cellular network. By keeping both connections open during the call, the ISC is able to provide seamless handovers between the different networks, while limiting the amount of bandwidth used to the minimum required to keep the connections open on both networks. Substantially no modifications are required in the separate infrastructures of the two cellular networks.

Alternatively or additionally, other criteria may be used to control switching between the two cellular networks. For example, ISC 42 may be programmed to route the call data traffic via the cellular network that gives the lower cost to user 22.

Figure 4:
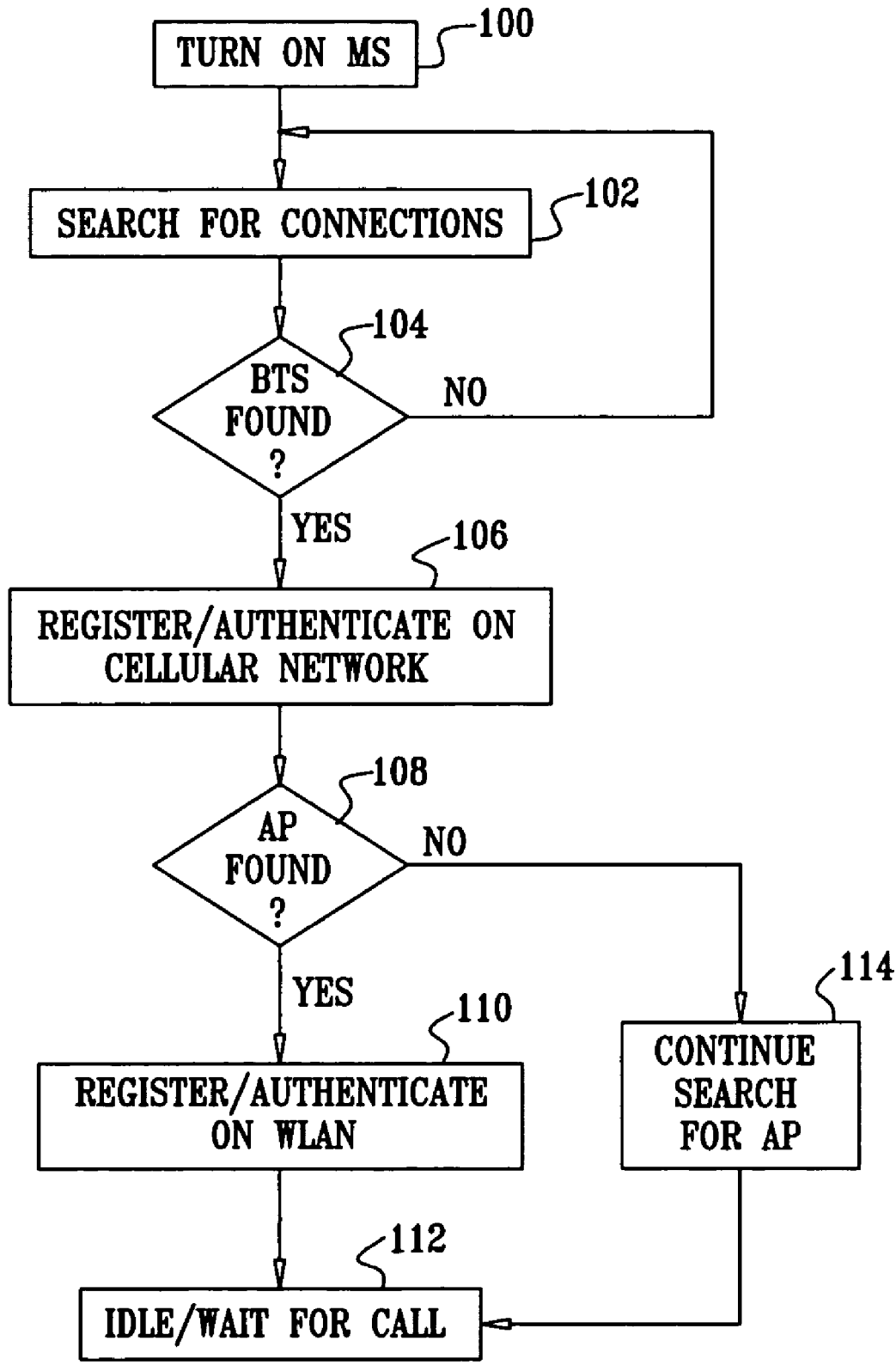
FIG. 4 is a flow chart that schematically illustrates a method for establishing network connections, in accordance with an embodiment of the present invention.

FIG. 4 is a flow chart that schematically illustrates a method used by mobile station 24 in establishing connections to ISC 42 via cellular network 30 and packet network 40, in accordance with an embodiment of the present invention. The method is initiated when user 22 turns on the mobile station, at a startup step 100. The mobile station simultaneously searches for a connection to the cellular network using cellular transceiver 70, and for a connection to the packet network using WLAN transceiver 74, at a search step 102. The mobile station searches the cellular network until it finds base station 34, at a base station connection step 104. Upon finding the cellular base station, transceiver 70 registers mobile station 24 with the cellular network, at a cellular registration step 106. The mobile station also carries out the standard authentication procedures that are required by the cellular network. The mobile station is now prepared to place and receive calls via the cellular network, regardless of whether or not it succeeds in finding a suitable WLAN.

WLAN transceiver 74 searches for a WLAN until it finds access point 38, at an access point connection step 108. (Although this step is shown as taking place serially, after steps 104 and 106, it may in fact proceed in parallel with these steps.) Once the transceiver has located the access point, it proceeds with the registration and authentication steps required by the applicable WLAN protocol, at a WLAN registration step 110. Typically, the WLAN registration is followed by subsequent registration and authorization procedures further along the packet network access path. For example, after mobile station 24 has been authenticated and associated with access point 38, it must then be identified and authorized on access network 58 in order to gain access to packet network 40. Thereafter, the mobile station contacts ISC 42, in order to register and be authorized to send and receive data traffic to and from cellular network 30 through the ISC. This last registration step permits the ISC to track the use of this facility by the mobile station and thus generate call detail records for use by the cellular network operator in billing and other management functions.

After completing the registration and authentication procedures on both the cellular and packet networks, mobile station 24 enters an idle state, while waiting for initiation of a call, at an idling step 112. In this state, the mobile station intermittently repeats its search for connections, in an attempt to find a new base station or access point that gives signals of better quality, or to find a new base station or access point in case one of the existing connections fails. Typically, the mobile station performs this search relatively infrequently in order to avoid running down its battery, except while a call is actually going on. If the mobile station is not successful in finding an access point at step 108, it continues to search for an access point intermittently at step 114. As noted earlier, however, the mobile station while in this state is still capable of placing and receiving calls over cellular network 30.

FIG. 5 is a flow chart that schematically illustrates a method by which ISC 42 controls the flow of data traffic during a call to or from mobile station 24, in accordance with an embodiment of the present invention. This method starts after the mobile station has connected to and been authenticated by ISC 42, as described above with reference to FIG. 4. It is initiated when a call is placed either to or by the mobile station, at a call initiation step 120. The ISC then sets up the call, including opening active connections to the mobile station through both cellular network 30 and packet network 40. The signaling involved in setting up the call is described in the Appendix.

During the call, ISC 42 monitors packets transmitted by mobile station 24 via packet network 40 in order to measure the QoS on the packet network connection, at a QoS monitoring step 122. In the example shown in the figure, the ISC monitors the delay (i.e., the latency) incurred by packets on the path between the mobile station and the ISC. The delay may be monitored, for instance, by sending test packets from the ISC to the mobile station, which require the mobile station to respond, and then measuring the round-trip time that it takes for the response to arrive. Alternatively or additionally, other measures of QoS may be used, such as packet jitter and/or error rate.

ISC 42 compares the measured delay (or other QoS metric) to a first threshold, identified in the figure as TH1. If the delay is greater than the threshold, ISC 42 determines that the data traffic on the call should be transmitted via cellular transceiver 70 and base station 34, at a cellular network selection step 124. The ISC may instruct the mobile station accordingly, by sending a control message via packet network 40. As noted above, however, the mobile station is typically configured to default to transmission via transceiver 70 in the absence of messages from ISC 42, so that the ISC need not necessarily send a control message at step 124. On the downlink, at step 124, ICS 42 transmits the data traffic to BSS 34. ISC 42 periodically reevaluates the packet network delay, at step 122, by sending and/or receiving signaling packets through access point 38, in order to determine whether the QoS has improved sufficiently so that the packet network connection can be used for the call.

If the measured delay is found at step 122 to be less than TH1, ISC 42 determines that the data traffic on the call should be transmitted through packet network 40, at a packet network selection step 126. In this case, the ICS instructs mobile station 24 to transmit uplink data via WLAN transceiver 74, while transmitting silence via cellular transceiver 70, as described above. After conversion of the uplink VoIP packets to cellular voice data by gateway 60, ICS 42 forwards the data via MSC 36 to telephone 32. The downlink is handled in similar fashion: ICS 42 transmits the voice data from telephone 32 via gateway 60 and packet network 40 to WLAN transceiver 74, while transmitting silence (null data) to base station 34.

Periodically, after transmitting data traffic for a certain period through packet network 40, ISC 42 reevaluates the QoS on the packet connection, at a QoS rechecking step 128. Again, packet delay is chosen, by way of example, as a representative measure of QoS. As long as the delay remains less than a second threshold TH2, the ISC determines that transmission of the data traffic through packet network 40 should continue, at step 126. In this case, the ISC will send another message to mobile station 24, instructing it to continue using WLAN transceiver 74 for the data traffic. TH2 may be chosen to be greater than TH1 so as to introduce a certain amount of hysteresis into the decision of the ISC and thus avoid rapid dithering between networks. If the delay has increased, however (as will also be the case if the WLAN connection has been lost), the ISC switches to transmission via cellular network 30, at step 124.

Optionally, ISC 42 may also be used to transfer the call from mobile station 24 to a land line, at the request of user 22. The user typically makes the request by pressing a certain sequence of keys on the keypad of the mobile station. In response, the ISC opens a new connection through a wired network (not shown) to the telephone number specified by the user. The connection may be made through MSC 36, for example, or through network 64 (FIG. 2). This latter network may comprise a packet data network, as mentioned earlier, or it may alternatively or additionally comprise a public switched telephone network (PSTN). The ISC keeps the connection through base station 34 to mobile station 24 open until the new connection has been made. It may then either disconnect the cellular connection, or keep this connection open for the duration of the call.

Although the embodiments described above relate specifically to telephone networks, and particularly cellular networks, the principles of the present invention may also be applied in optimization of data routing and transport in networks of other types, such as IP networks. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX—TERMINATING CALL SCENARIO

For the purpose of this scenario, it is assumed that telephone 32 places a call to mobile station 24. Signaling in network 30 is assumed to use the standard SS7 protocol stack and ISDN User Part (ISUP) messaging conventions. Call setup messages are transmitted in the following sequence:

1. Upon initiation of the call, an initial address message (IAM) is transmitted to MSC 36, in order to reserve a trunk circuit from the base station serving telephone 32 to base station 34. The IAM includes the telephone number of mobile station 24.
2. MSC 36 passes a send routing information (SRI) message to HLR 50, asking for details regarding mobile station 24.
3. HLR 50 sends a SRI response, providing MSC 36 with a trigger that was stored in the HLR to indicate that mobile station 24 is assigned to an IN service.
4. MSC 36 now sends an initial detection point (IDP) signaling message to SCP 56, asking the SCP for instructions on how to handle this call.
5. SCP 56 passes a SRI query to HLR 50 regarding mobile station 24. The SCP needs to discover both the service that is to be provided to mobile station 24 and the location at which the service is to be provided.
6. HLR 50 passes a provide roaming number (PRN) message to VLR 52, asking the VLR for the current location of mobile station 24.
7. VLR 52 returns a PRN response to the HLR, giving the mobile station roaming number (MSRN) of mobile station 24.
8. HLR 50 sends a SRI response to SCP 56, indicating the MSRN.
9. SCP 56 instructs MSC 36 to connect the call. The connect message includes the prefix and MSRN for the mobile station, as well as the calling party number, the called party number and the redirecting party number.
10. MSC 36 now sends an IAM to ISC 42, conveying the call parameters that it received from SCP 56 at the preceding step.
11. ISC 42 responds with an address complete message (ACM), to indicate that it has reserved the remote end of the trunk circuit required for the call.
12. MSC 36 relays the ACM to the originating switch, from which the IAM was received at step 1.
13. ISC 42 sends a SIP message to gateway 60 in order to open the connection to the mobile station through packet network 40.
14. ISC 42 sends an IAM to VLR 52, specifying the MSRN of mobile station 24, in order to open the connection to the mobile station through the cellular network.
15. VLR 52 responds with an ACM.
16. When mobile station 24 answers the call, VLR 52 sends an answer message (ANM) to ISC 42, indicating that the call has been answered.
17. When the connection through network 40 has been completed, gateway 60 sends a SIP response to ISC 42.
18. ISC 42 then sends an ANM to MSC 36.
19. MSC 36 relays the ANM to the originating switch, and the call can now proceed.

For calls originating at mobile station 24, the process is similar to that described above, but with fewer messages, since the prefix and MSRN of the mobile station initiating the call are already known. Details of this process will be apparent to those skilled in the art based on the terminating call scenario described above.

The invention claimed is:

1. A method for communication, comprising:
   initiating a call between a mobile station in a cellular communication network and a subscriber unit that is accessible via the cellular communication network;
   opening a first connection to serve the call between a base station in the cellular communication network and the mobile station;
   opening a second connection to serve the call between the mobile station and an access point in a wireless local area network (WLAN); and
   conveying data traffic between the mobile station and the subscriber unit so as to continue the call via the second connection while keeping the first connection open throughout the call.

2. The method according to claim 1, wherein the call comprises at least one of a voice call and a video call, and wherein conveying the data traffic comprises conveying at least one of voice data and video data.

3. The method according to claim 1, wherein initiating the call comprises receiving a request to place the call at a switch in the cellular communication network from the subscriber unit, and opening the first and second connections responsively to the request.

4. The method according to claim 1, wherein initiating the call comprises receiving a request to place the call at a switch in the cellular communication network from the mobile station, and opening the second connection responsively to the request.

5. The method according to claim 1, wherein initiating the call comprises notifying an information switching center (ISC), which is coupled to the cellular communication network, of a request to open the call, and wherein opening the second connection comprises opening the second connection from the access point to the ISC via a packet network.

6. The method according to claim 5, wherein opening the second connection comprises configuring the second connection to provide a predetermined quality of service (QoS) in order to serve the call.

7. The method according to claim 6, wherein configuring the second connection comprises providing a tunnel through the packet network.

8. The method according to claim 5, wherein initiating the call comprises receiving a trigger at a switch in the cellular communication network responsively to an identity of the mobile station, and notifying the ISC of the request responsively to the trigger.

9. The method according to claim 1, wherein conveying the data traffic comprises transmitting null data over the first connection.

10. The method according to claim 1, and comprising, if the second connection is broken during the call, continuing to transmit the data traffic via the first connection.

11. The method according to claim 1, wherein conveying the data traffic comprises measuring a quality of service (QoS) on the second connection, and conveying the data traffic via the second connection if the QoS exceeds a predetermined threshold, while conveying the data traffic via the first connection if the QoS on the second connection is below the predetermined threshold.

12. The method according to claim 11, wherein measuring the QoS comprises measuring a packet delay in transmission over the second connection.

13. The method according to claim 11, wherein measuring the QoS comprises monitoring the QoS during the call, and if the QoS decreases below a predetermined level, transmitting the data traffic via the first connection rather than the second connection.

14. The method according to claim 1, and comprising receiving, during the call, a request to transfer the call from the mobile station to a land line, and transferring the call to the land line, responsively to the request, while keeping the first connection open.

15. A method for communication, comprising:
    initiating a call between a mobile station in a cellular communication network and a subscriber unit that is accessible via the cellular communication network;
    opening a first connection to serve the call between a base station in the cellular communication network and the mobile station;
    opening a second connection to serve the call between the mobile station and an access point in a wireless local area network (WLAN); and
    while the first connection is open, conveying data traffic between the mobile station and the subscriber unit via the second connection,
    wherein conveying the data traffic comprises transmitting null data over the first connection, and
    wherein the mobile station has first and second radio interfaces for communicating via the cellular communication network and the WLAN, respectively, and wherein transmitting the null data comprises sending an instruction to the mobile station via the second radio interface to transmit the null data via the first radio interface while transmitting the data traffic via the second radio interface.

16. The method according to claim 15, wherein sending the instruction comprises sending a sequence of messages, each message instructing the mobile station to transmit the data traffic via the second radio interface for a successive predetermined time interval.

17. The method according to claim 16, and comprising, if the mobile station does not receive a further message within the predetermined time interval of a preceding message in the sequence, transmitting the data traffic subsequent to the predetermined time interval via the first radio interface.

18. A method for communication, comprising:
    opening a connection, via a base station in a cellular communication network, between a mobile station and a switch in the cellular communication network; and
    conveying data traffic between the mobile station and the switch over a call conducted via an access point in a wireless local area network (WLAN) while keeping the connection via the base station open throughout the call.

19. The method according to claim 18, wherein opening the connection comprises linking the base station to an information switching center (ISC), and wherein conveying the data traffic comprises transmitting the data traffic between the access point and the ISC via a packet network.

20. The method according to claim 19, wherein the ISC is connected to a further communication network, separate from the cellular communication network, and wherein conveying the data traffic comprises passing the data traffic via the ISC between the mobile station and a second party on the further communication network.

21. The method according to claim 20, wherein the further communication network comprises a packet network, and wherein passing the data traffic comprises placing a Voice over Internet Protocol (VoIP) call between the mobile station and the second party.

22. The method according to claim 19, wherein the mobile station is coupled to communicate via multiple access points in one or more WLANs, and wherein conveying the data traffic comprises selecting one of the access points to communicate with the mobile station using the ISC.

23. The method according to claim 22, wherein selecting the one of the access points comprises measuring a quality of service (QoS) of transmission of data packets via each of the access points, and selecting the one of the access points responsively to the QoS.

24. The method according to claim 22, wherein the mobile station is one of a plurality of mobile stations that are coupled to the one or more WLANs, and wherein selecting the one of the access points comprises assigning a respective one of the access points to serve each of the mobile stations so as to provide a common bandwidth to all of the mobile stations.

25. The method according to claim 18, wherein conveying the data traffic comprises transmitting null data over the connection while conveying the data traffic via the access point.

26. A method for communication, comprising:
    opening a connection, via a base station in a cellular communication network, between a mobile station and a switch in the cellular communication network; and while the connection is open, conveying data traffic between the mobile station and the switch via an access point in a wireless local area network (WLAN), wherein conveying the data traffic comprises transmitting null data over the connection while conveying the data traffic via the access point, and wherein the mobile station has first and second radio interfaces for communicating via the cellular communication network and the WLAN, respectively, and wherein transmitting the null data comprises sending an instruction to the mobile station via the second radio interface to transmit the null data via the first radio interface while transmitting the data traffic via the second radio interface.

27. The method according to claim 18, wherein conveying the data traffic comprises conveying a first portion of the data traffic via the access point while simultaneously conveying a second portion of the data traffic via the connection.

28. The method according to claim 18, wherein conveying the data traffic comprises measuring a quality of service (QoS) of transmission of data packets via the WLAN, and conveying the data traffic via the access point if the QoS exceeds a predetermined threshold, while conveying the data traffic via the connection if the QoS via the WLAN is below the predetermined threshold.

29. The method according to claim 18, wherein conveying the data traffic comprises selectively conveying a portion of the data traffic via the access point so as to minimize a volume of the data traffic that is conveyed through the cellular communication network.

30. The method according to claim 18, wherein conveying the data traffic comprises selectively conveying a portion of the data traffic via the access point so as to maximize a number of calls carried by the cellular communication network.

31. The method according to claim 18, wherein conveying the data traffic comprises conveying a first portion of the data traffic via the access point and conveying a second portion of the data traffic via the connection, while allocating the data traffic between the first and second portions so as to maintain a constant bandwidth for transmission of the data traffic to the mobile station.

32. The method according to claim 18, wherein conveying the data traffic comprises controlling conveyance of the data traffic via the access point and the connection using an application-level program running on the mobile station.

33. A method for communication, comprising:

opening a connection, via a base station in a cellular communication network, between a mobile station and a switch in the cellular communication network; and conveying data traffic between the mobile station and the switch over a call conducted via an ancillary communication network, while keeping the connection via the base station open throughout the call without conveying the data traffic through the base station.

34. The method according to claim 33, wherein the ancillary communication network comprises a packet data network.

35. The method according to claim 34, wherein the packet data network comprises a wireless local area network (WLAN).

36. The method according to claim 33, wherein opening the connection comprises opening a first connection via a first cellular communication network, and wherein the ancillary communication network comprises a second cellular communication network.

37. The method according to claim 33, wherein opening the connection comprises opening a first connection between the mobile station and an information switching center (ISC), and wherein conveying the data traffic comprises opening a second connection between the mobile station and the ISC via the ancillary communication network.

38. The method according to claim 33, wherein conveying the data traffic comprises transmitting null data over the connection while conveying the data traffic via the ancillary communication network.

39. The method according to claim 33, wherein conveying the data traffic comprises measuring a quality of service (QoS) of transmission of data packets via the ancillary communication network, and conveying the data traffic via the ancillary communication network if the QoS exceeds a predetermined threshold, while conveying the data traffic via the cellular communication network if the QoS on the second connection is below the predetermined threshold.

40. The method according to claim 33, wherein conveying the data traffic comprises assessing respective costs of conveying the data traffic via the cellular communication network and the ancillary communication network, and deciding whether to convey the data traffic via the cellular communication network or the ancillary communication network responsively to the respective costs.

41. Apparatus for communication, comprising:

a mobile station, having a first radio interface for communicating with a cellular communication network, and a second radio interface for communicating with a wireless local area network (WLAN); and an information switching controller (ISC), which is adapted to receive a message indicative of initiation of a call between the mobile station and a subscriber unit that is accessible via the cellular communication network, and is further adapted, responsively to the message, to open a first connection to serve the call between a base station in the cellular communication network and the mobile station, and to open a second connection to serve the call between the mobile station and an access point in the WLAN, and to cause data traffic to be conveyed between the mobile station and the subscriber unit via the second connection while the first connection is open.

42. The apparatus according to claim 41, wherein the call comprises at least one of a voice call and a video call, and wherein the data traffic comprises at least one of voice data and video data.

43. The apparatus according to claim 41, wherein the message is indicative of a request by the subscriber unit to place the call.

44. The apparatus according to claim 41, wherein the message is indicative of a request by the mobile station to place the call.

45. The apparatus according to claim 41, wherein the ISC is coupled to receive the message from a switch in the cellular communication network, and is further coupled to the access point via a packet network.

46. The apparatus according to claim 45, wherein the second connection is configured via the packet network to provide a predetermined quality of service (QoS) in order to serve the call.

47. The apparatus according to claim 46, wherein the second connection comprises a tunnel through the packet network.

48. The apparatus according to claim 45, wherein the ISC is configured to receive the message in response to a trigger received by the switch in the cellular communication network responsively to an identity of the mobile station.

49. The apparatus according to claim 41, wherein the ISC is adapted to cause null data to be transmitted over the first connection while the data traffic is conveyed via the second connection.

50. The apparatus according to claim 49, wherein the ISC is adapted to send an instruction to the mobile station via the second radio interface to transmit the null data via the first radio interface while transmitting the data traffic via the second radio interface.

51. The apparatus according to claim 50, wherein the ISC is adapted to send a sequence of messages to the mobile station, each message instructing the mobile station to transmit the data traffic via the second radio interface for a successive predetermined time interval.

52. The apparatus according to claim 51, wherein the mobile station is adapted to transmit the data traffic subsequent to the predetermined time interval via the first radio interface if the mobile station does not receive a further message within the predetermined time interval of a preceding message in the sequence.

53. The apparatus according to claim 41, wherein the ISC is adapted to cause the mobile station and the base station to transmit the data traffic via the first connection if the second connection is broken during the call.

54. The apparatus according to claim 41, wherein the ISC is adapted to measure a quality of service (QoS) on the second connection, and to cause the data traffic to be conveyed via the second connection if the QoS exceeds a predetermined threshold, while causing the data traffic to be conveyed via the first connection if the QoS on the second connection is below the predetermined threshold.

55. The apparatus according to claim 54, wherein the ISC is adapted to determine the QoS by measuring a packet delay in transmission over the second connection.

56. The apparatus according to claim 54, wherein the ISC is adapted to monitor the QoS during the call, and if the QoS decreases below a predetermined level, to cause the data traffic to be transmitted via the first connection rather than the second connection.

57. The apparatus according to claim 41, wherein the ISC is adapted to receive, during the call, a request to transfer the call from the mobile station to a land line, and to transfer the call to the land line, responsively to the request, while keeping the first connection open.

58. Apparatus for communication, comprising:
a mobile station, having a first radio interface for communicating with a cellular communication network, and a second radio interface for communicating with a wireless local area network (WLAN); and
an information switching controller (ISC), which is adapted to open a connection, via a base station in the cellular communication network, between the mobile station and a switch in the cellular communication network, and to cause data traffic to be conveyed between the mobile station and the switch so as to conduct a call via an access point in a wireless local area network (WLAN) while keeping the connection via the base station open throughout the call.

59. The apparatus according to claim 58, wherein the ISC is coupled to the access point via a packet network.

60. The apparatus according to claim 59, wherein the ISC is connected to a further communication network, separate from the cellular communication network, and is adapted to pass the data traffic between the mobile station and a second party on the further communication network.

61. The apparatus according to claim 60, wherein the further communication network comprises a packet network, and the ISC is adapted to place a Voice over Internet Protocol (VoIP) call between the mobile station and the second party.

62. The apparatus according to claim 58, wherein the mobile station is coupled to communicate via multiple access points in one or more WLANs, and wherein the ISC is adapted to select one of the access points to communicate with the mobile station using the ISC.

63. The apparatus according to claim 62, wherein the ISC is adapted to measure a quality of service (QoS) of transmission of data packets via each of the access points, and to select the one of the access points responsively to the QoS.

64. The apparatus according to claim 62, wherein the mobile station is one of a plurality of mobile stations that are coupled to the one or more WLANs, and wherein the ISC is adapted to select a respective one of the access points to serve each of the mobile stations so as to provide a common bandwidth to all of the mobile stations.

65. The apparatus according to claim 58, wherein the ISC is adapted to cause null data to be transmitted over the connection while the data traffic is conveyed via the access point.

66. The apparatus according to claim 65, wherein the ISC is adapted to send an instruction to the mobile station via the second radio interface to transmit the null data via the first radio interface while transmitting the data traffic via the second radio interface.

67. The apparatus according to claim 58, wherein the ISC is adapted to convey a first portion of the data traffic via the access point while simultaneously conveying a second portion of the data traffic via the connection.

68. The apparatus according to claim 58, wherein the ISC is adapted to measure a quality of service (QoS) of transmission of data packets via the WLAN, and to cause the data traffic to be conveyed via the access point if the QoS exceeds a predetermined threshold, while causing the data traffic to be conveyed via the first connection if the QoS on the second connection is below the predetermined threshold.

69. The apparatus according to claim 58, wherein the ISC is adapted to selectively convey a portion of the data traffic via the access point so as to minimize a volume of the data traffic that is conveyed through the cellular communication network.

70. The apparatus according to claim 58, wherein the ISC is adapted to selectively convey a portion of the data traffic via the access point so as to maximize a number of calls carried by the cellular communication network.

71. The apparatus according to claim 58, wherein the ISC is adapted to convey a first portion of the data traffic via the access point and to convey a second portion of the data traffic via the connection, while allocating the data traffic between the first and second portions so as to maintain a constant bandwidth for transmission of the data traffic to the mobile station.

72. The apparatus according to claim 58, wherein the ISC is adapted to control conveyance of the data traffic via the access point and the connection by operation of an application-level program running on the mobile station.

73. Apparatus for communication, comprising:
a mobile station, having a first interface for communicating with a cellular communication network, and a second interface for communicating with an ancillary communication network, which is separate from the cellular communication network; and
an information switching controller (ISC), which is adapted to open a connection, via a base station in the cellular communication network, between the mobile station and a switch in the cellular communication network, and to cause data traffic to be conveyed between the mobile station and the switch via a call conducted over the ancillary communication network while keeping the connection via the base station open throughout the call, without conveying the data traffic through the base station.

74. The apparatus according to claim 73, wherein the ancillary communication network comprises a packet data network.

75. The apparatus according to claim 74, wherein the packet data network comprises a wireless local area network (WLAN).

76. The apparatus according to claim 73, wherein the cellular communication network comprises a first cellular communication network, and wherein the ancillary communication network comprises a second cellular communication network.

77. The apparatus according to claim 73, wherein the ISC is coupled to convey the data traffic to and from the mobile station via the ancillary communication network.

78. The apparatus according to claim 73, wherein the ISC is adapted to cause null data to be transmitted over the connection while the data traffic is conveyed via the ancillary communication network.

79. The apparatus according to claim 73, wherein the ISC is adapted to measure a quality of service (QoS) of transmission of data packets via the ancillary communication network, and to cause the data traffic to be conveyed via the ancillary communication network if the QoS exceeds a predetermined threshold, while causing the data traffic to be conveyed via the cellular communication network if the QoS on the second connection is below the predetermined threshold.

80. The apparatus according to claim 73, wherein the ISC is adapted to assess respective costs of conveying the data traffic via the cellular communication network and the ancillary communication network, and to decide whether to convey the data traffic via the cellular communication network or the ancillary communication network responsively to the respective costs.

* * * * *